May 26, 1970
T. H. ENGLE
3,513,656
PRESSURE TRANSLATORS
Filed March 17, 1969
2 Sheets-Sheet 1
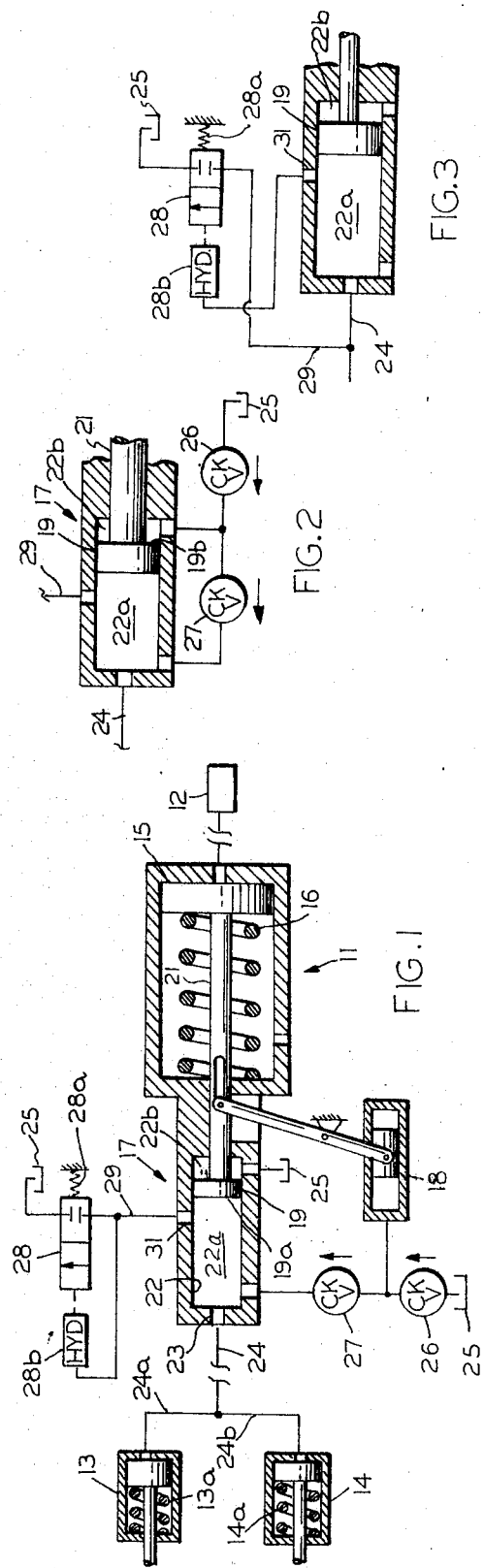
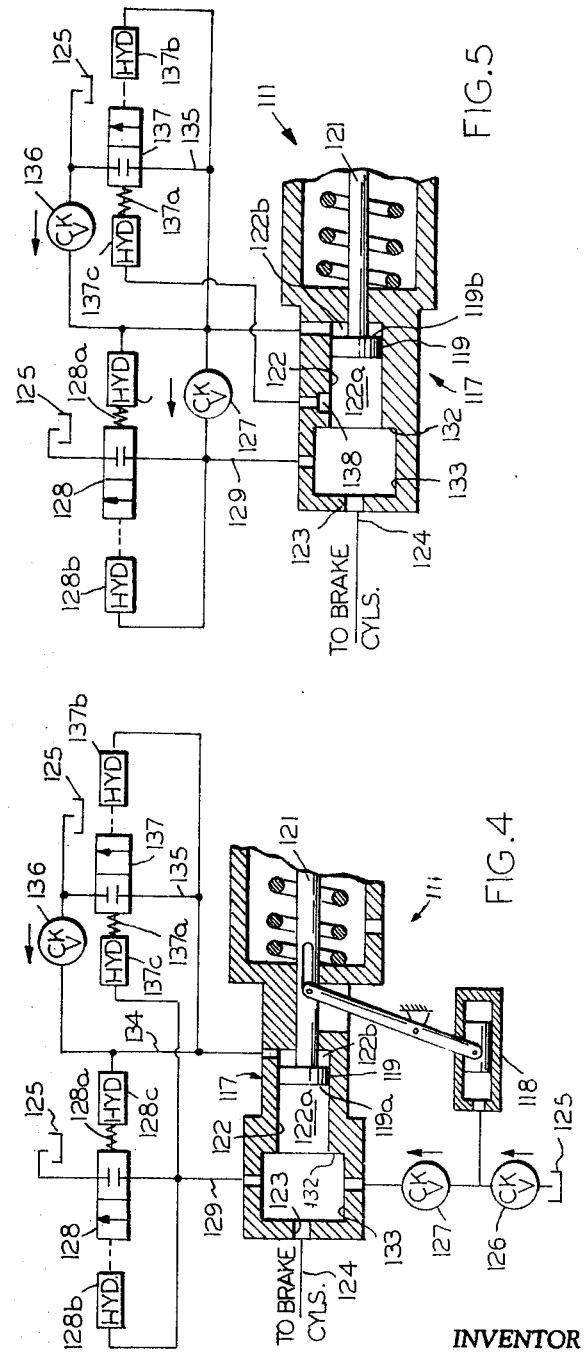
INVENTOR
THOMAS H. ENGLE
BY
ATTORNEYS

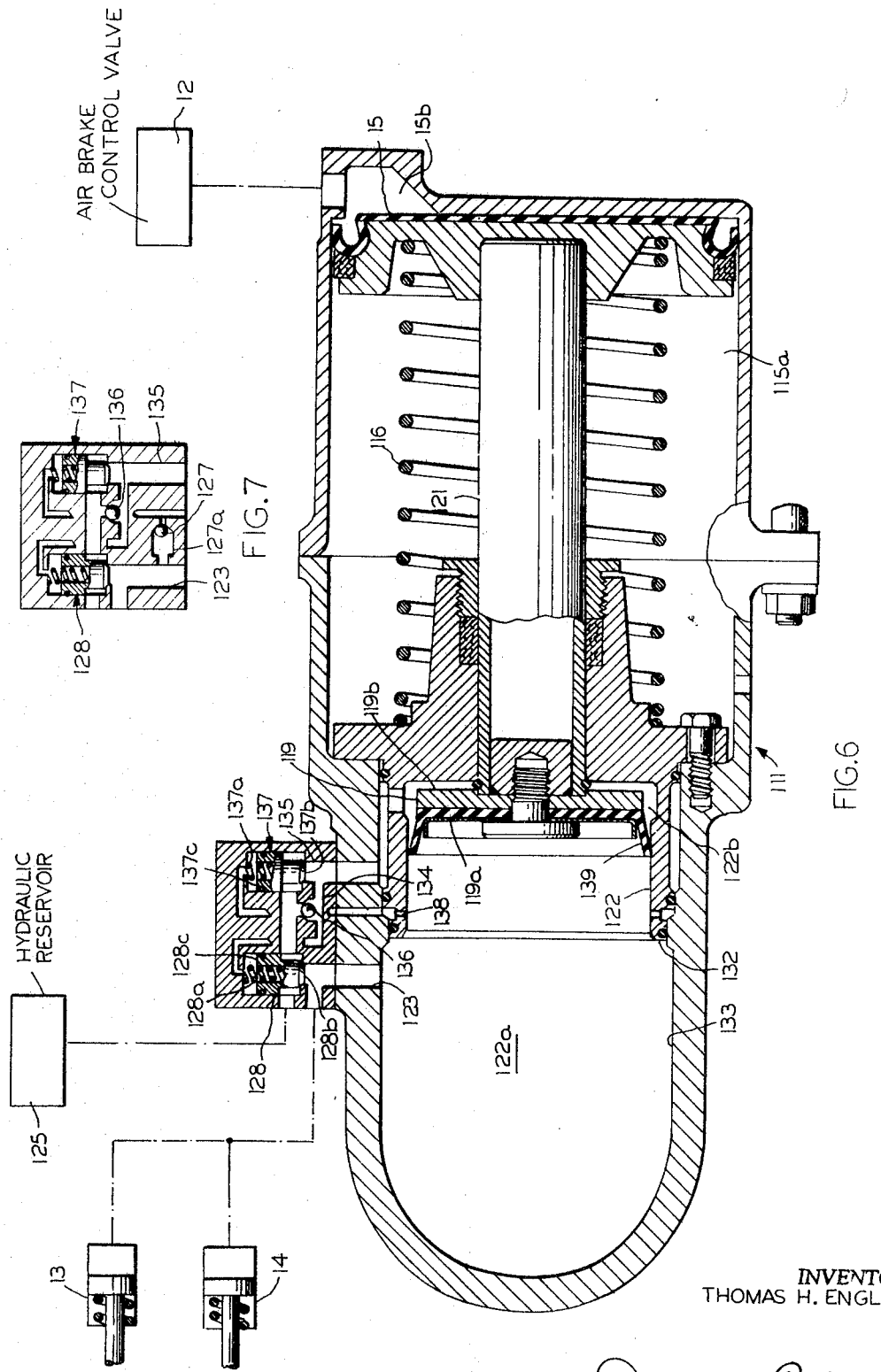

United States Patent Office 3,513,656
Patented May 26, 1970

3,513,656
PRESSURE TRANSLATORS
Thomas H. Engle, Cape Vincent, N.Y., assignor to General Signal Corporation, a corporation of New York
Continuation-in-part of application Ser. No. 746,684, July 22, 1968. This application Mar. 17, 1969, Ser. No. 812,551
Int. Cl. F15b 7/00, 7/08
U.S. Cl. 60—54.5                    18 Claims

ABSTRACT OF THE DISCLOSURE

A pressure translator for braking or similar systems which transduces fluid pressures into proportional but higher hydraulic pressures and serves as a double-acting slack adjuster. The translator comprises a fluid pressure-operated main hydraulic pump of the piston type, relief mechanism which is effective during an initial stage of each discharge stroke to bleed oil from the working space of the main pump, and make-up pumping means which automatically delivers a fixed volume of oil to the working space during each cycle of the main pump. The volumetric displacement per unit of travel of the main pump may be constant throughout each discharge stroke, or it may be set at a high value for said initial stage and then switched automatically to a lower value for the balance of each stroke.

CROSS REFERENCE TO RELATED APPLICATION

This application is a continuation-in-part of my copending application Ser. No. 746,684, filed July 22, 1968, now abandoned.

BACKGROUND OF THE INVENTION

At the present time, most railroad cars use an air-operated braking system. Each car normally is equipped with auxiliary and emergency reservoirs, which are charged from a brake pipe extending through the train, and a control valve which responds to changes in brake pipe pressure and serves to control the flow of air to and from the brake cylinders. During service applications, the brake cylinders are supplied exclusively from the auxiliary reservoir, and maximum braking effort is realized when the pressures in this reservoir and in the brake cylinders are allowed to equalized. On the other hand, during an emergency application, the volume of the emergency reservoir is automatically added to that of the auxiliary reservoir and, as a result, the equalization pressure is increased. For a standard system using the normal maximum brake pipe pressure of 70 p.s.i., the equalization pressures for full service and emergency applications are approximately 50 and 60 p.s.i., respectively.

Since the railroad industry has standardized on relatively low braking pressures, and practical considerations limit the diameters of the brake cylinders, it has been necessary to use force-multiplying linkages in order to obtain the high braking forces required at the shoes. As the weight of the car increases, so too do the braking requirements. Hence, heavier cars use linkages affording greater mechanical advantages than lighter cars. Since a force-multiplying linkage inherently increases the length of that portion of the stroke of the brake cylinder required to take up shoe clearance, even though mechanical slack adjusters are provided, it is evident that the air demands imposed on the reservoirs increase with car weight. This, of course, means that the size of the reservoirs must be increased, for otherwise the desired equalization pressures could not be maintained. When car weight reaches the level at which the unit loadings at the wheels become excessive, the number of axles must be increased. For example, at the present time the specifications for the U.S. railroad industry require an increase from four to six axles at a car weight of 125 tons. As more axles are used, more brake cylinders must be provided, and this too necessitates an increase in the energy storage capacity of the reservoirs. Moreover, as the number of axles increases, it becomes increasingly more difficult to design and install the necessary force-multiplying linkages. The reservoirs in service today are already as large as practical, both from the standpoint of space considerations and charging time, yet there is no known scheme for effecting further increases in the braking capacity (i.e., either the force per shoe or the total shoe force per car) afforded by present-day air brake systems which does not necessarily require a further increase in energy storage capacity.

SUMMARY OF THE INVENTION

A prime object of this invention is to provide a device for use with existing air brake equipment which eliminates the need for mechanical force-multiplying linkages, and depending on the viewpoint, also effects either material increases in braking capacity without raising energy storage requirements or substantial reductions in the energy storage capacity required to handle existing levels of braking capacity. In brief, the device provided by the invention is a fluid pressure translator which is adapted to transduce the output of the standard air brake control valve into proportional but higher hydraulic pressures, and to serve as a double-acting slack adjuster or compensator. The transducing function is performed by a pressure motor-operated main hydraulic pump of the reciprocating piston type. The pressure-transducing ratio depends upon the ratio of the effective areas of the motor and the pump and is made high enough to obviate force-multiplying linkages. Compensation for shoe clearance-increasing factors, such as wear, leakage and contraction of the hydraulic fluid, is provided by a make-up pump which is activated during each pumping cycle of the main pump, preferably on the return stroke. This pump introduces into the closed brake cylinder circuit a fixed quantity of oil sized to offset the maximum increase in shoe clearance which can be expected during a brake application. The capacity of the make-up pump includes an ample safety margin, thereby insuring that the main pump will not "bottom out," i.e., reach the end of its discharge stroke, before the brake shoes engage the wheels. Because of this, the stroke of the main pump can be kept to a minimum. Shoe clearance-decreasing factors, such as shoe replacement, oil expansion and the excess capacity of the make-up pump, are compensated by a relief mechanism which is effective to bleed oil from the brake cylinder circuit during an initial stage of each discharge stroke of the main pump. The relief mechanism responds to the pressure in the cylinder circuit and is set to open at a pressure indicative of completion of clearance take-up. After the main pump reaches a predetermined point in its discharge stroke, the relief path is automatically closed, and the transducer is rendered effective to develop the high output pressure needed for a brake application.

The new translator affords much more exact slack compensation than the mechanical slack adjusters now in use, and, as a result, permits maintenance of a substantially constant shoe clearance. This advantage can be exploited in either of two ways, each of which results in conservation of air. In one case, the translator is used to maintain a very small shoe clearance, i.e., essentially zero clearance. In this version, the volumetric displacement per unit of travel of the main pump is constant throughout each discharge stroke, but, since this stroke inherently is quite short because only a small amount of oil is required for clearance take-up, the volume of air needed for a brake application is considerably smaller than in a conventional system. The second version of the translator is used to maintain a substantial shoe clearance, for example, a clearance on the order of 5/8". Here, the main pump is designed to afford two different and independent pressure-transducing ratios; a low ratio, with accompanying high volumetric displacement per unit of travel, being employed during the initial stage of each discharge stroke, and the normal, high ratio, with accompanying low volumetric displacement per unit of travel, being used during the balance of each such stroke. The use of two pressure-transducing ratios minimizes air consumption without adversely affecting the transducer's ability to develop high braking pressures. And, this feature is practical because the relief portion of the slack compensation scheme insures that the main pump will enter the second or high pressure stage of its discharge stroke during each brake application regardless of the fact that clearance take-up is complete before the end of the low pressure stage.

BRIEF DESCRIPTION OF THE DRAWINGS

The invention is described herein in detail with reference to the accompanying drawings in which:

FIG. 1 is a schematic diagram of a form of the pressure translator which affords a single pressure-transducing ratio.

FIG. 2 is a schematic diagram of a portion of the FIG. 1 translator showing the preferred arrangement of the make-up pump.

FIG. 3 is a schematic diagram of a portion of the FIG. 1 translator showing an alternative relief mechanism.

FIG. 4 is a schematic diagram of a form of the pressure translator which affords two pressure-transducing ratios.

FIG. 5 is a schematic diagram showing the preferred arrangement of the make-up pump for the FIG. 4 translator.

FIG. 6 is a sectional view of a two-stage translating device of the type shown schematically in FIG. 5.

FIG. 7 is a sectional view of a modified valve package for the FIG. 6 translating device showing the preferred design of the make-up scheme.

DESCRIPTION OF THE EMBODIMENTS OF FIGS. 1–3

Referring to FIG. 1, the single-stage pressure translator 11 is interposed in the braking system of a railroad car where it is utilized to transduce the output of air brake control valve 12 into a proportional hydraulic pressure which is delivered to the brake cylinders, represented by two cylinders 13 and 14. The translator 11 comprises an air motor 15 which responds to the output of control valve 12 and which, together with a return spring 16, serves to actuate a main hydraulic pump 17 and a make-up pump 18. The main pump 17 includes a differential area piston 19 which is connected with motor 15 through a rod 21, and which reciprocates in a cylinder 22 and divides the latter into head and rod end spaces 22a and 22b. Space 22a is the working space of pump 17, and it is in free, constant communication with the brake cylinders 13 and 14 through port 23, main pipe 24 and branch pipes 24a and 24b. Space 22b, on the other hand, is vented to a hydraulic reservoir or tank 25. The transducing ratio of translator 11 is equal to the ratio of the effective area of motor 15 to the area of the head end face 19a of piston 19. A typical transducing ratio is 15:1.

Shoe clearance-increasing effects are automatically compensated by the make-up pump 18 which is supplied with oil from reservoir 25 through a supply passage containing inlet check valve 26 and discharges the oil into working space 22a through a make-up passage containing discharge check valve 27. Although, as shown, pump 18 delivers oil to the closed brake cylinder circuit on the return stroke of pump 17, it could be arranged to perform this function on the discharge stroke. Reservoir 25 preferably is located at the highest elevation in the hydraulic system in order to maintain a positive gravity head at pump 18 and to encourage self-bleeding of air from the system. However, since self-bleeding requires several cycles of operation, purging of air usually is accomplished by manually operated bleed valves (not shown) located at the cylinders 13 and 14 or at high points in the system where air could collect. The capacity of make-up pump 18 is so selected that the quantity of oil delivered to working space 22a on each stroke is slightly greater than that needed to compensate for those factors, such as shoe wear and leakage, which tend to increase shoe clearance. The inclusion of the make-up pump insures that main pump 17 will not reach the limit of travel in the discharge direction before the brakes are applied, and thus makes possible use of a main pump having a discharge stroke of minimum length.

Factors which tend to decrease shoe clearance are compensated by relief mechanism including a relief valve 28 which is interposed in an exhaust passage 29 leading to tank 25, and a selector valve which comprises pump piston 19 and a port 31 formed in the wall of cylinder 22. The selector valve serves to connect exhaust passage 29 with working space 22a during an initial portion of each discharge stroke of pump 17, and to connect the passage with tank 25 through rod end space 22b during the balance of each discharge stroke. Relief valve 28 is biased closed by a spring 28a and is opened by actuating motor 28b which responds to the pressure in passage 29. The closing bias exerted by spring 28a is such that motor 28b will not open the valve until the pressure in passage 29 reaches a level slightly higher than the pressure required to cause cylinders 13 and 14 to take up shoe clearance.

When translator 11 is in service and the brakes are released, pumps 17 and 18 and valve 28 will be in their illustrated positions, and the oil-handling spaces and passages of the hydraulic circuit will be liquid-filled. If a brake application is now made, control valve 12 will supply air under pressure to motor 15 and cause it to move main pump 17 on its discharge stroke and to move make-up pump 18 on its suction stroke. As piston 19 moves to the left, it displaces oil from working space 22a and causes it to flow to and extend brake cylinders 13 and 14. The resistance to movement of the brake cylinders during the initial portion of an application is relatively small, so the pressure in space 22a will remain below the setting of valve 28, and the valve will stay closed. After shoe clearance has been taken up, the pressure in space 22a will rise above the setting of valve 28. Therefore, this valve will open and permit motor 15 to move piston 19 to a position slightly to the left of port 31. This action disconnects port 31 and passage 29 from working space 22a and thereby enables the translator to develop in the working space the high pressure required to apply the brakes. This pressure, of course, equals the output pressure of control valve 12 multiplied by the ratio of the effective area of motor 15 to the area of end face 19a. Piston 19 comes to rest in approximately the same end position on each discharge stroke; therefore, on the return strokes, it withdraws essentially the same quantity of oil from the brake cylinders. As a result, close control over shoe clearance can be realized.

When a brake release is initiated, the output pressure of control valve 12 decreases, and piston 19 commences to move to the right on its return stroke. Therefore, oil in brake cylinders 13 and 14 is transferred to working space 22a under the action of the cylinder return springs 13a and 14a. The rate of transfer is proportional to the area of head end face 19a. During the return stroke of piston 19, make-up pump 18 is effective to discharge into space 22a a fixed quantity of oil greater than that needed to compensate for any leakage or shoe wear which occurred during the preceding brake application. The excess make-up oil will be expelled from the circuit through relief valve 28 during the initial stage of the next discharge stroke of piston 19; therefore, at that time the length of the liquid column interconnecting piston 19 and the pistons of brake cylinders 13 and 14 is automatically adjusted to offset shoe wear, if any, which occurred during the preceding brake application. As a result, shoe clearance is maintained substantially constant.

In the course of service, the length of the liquid link between translator 11 and the brake cylinders 13 and 14 will increase progressively as the shoes wear. Therefore, when shoe replacement becomes necessary, there may or may not be sufficient space in which to insert the new shoe. If the cumulative clearance of the shoes actuated by the cylinders which translator 11 supplies is greater than the thickness of the new shoe, replacement can be effected simply by manually retracting the cylinder associated with the worn shoe and causing it to displace oil into, and thus extend, the other cylinders in the circuit. In cases where the cumulative shoe clearance is not sufficient to permit replacement, one of several other methods is used. One possibility is to manually retract the cylinder associated with the worn shoe as far as the cumulative clearance permits, insert a spacer between the worn shoe and its wheel, cycle the brakes to re-establish the controlled clearance with the spacer in place, and then repeat these operations using progressively wider spacers until the clearance required for the new shoe is provided. Another possibility is to retract the cylinder as far as cumulative clearance permits and then apply to it a force sufficient to raise the circuit pressure above the setting of relief valve 28. This, of course, will cause the relief valve to open and bleed from the circuit enough oil to accommodate the new shoe. This procedure requires the use of a lever or like tool and may not be practical if the effective areas of the brake cylinders are too large. A final possibility is to retract the cylinder while holding open the air-bleeding valve mentioned earlier to thereby bleed directly from the closed circuit the oil needed to accommodate the new shoe. In any case, and regardless of which method is used, the clearance at each shoe after a replacement is made will be less than that which the translator is intended to maintain. This reduced clearance condition will persist until the brakes are cycled, but, at that time, relief valve 28 will automatically bleed excess oil from the closed circuit and re-establish the desired clearance at each wheel.

In contrast to the FIG. 1 embodiment, which uses separate main and make-up pumps, the preferred single-stage translator, partially illustrated in FIG. 2, uses the main pump 17 to perform both functions. In this version, the rod end face 19b of piston 19 and the rod end space 22b serve as the make-up pump, and its capacity is determined by the difference between the cross sectional areas of piston 19 and rod 21. This arrangement is simpler and more compact than the one shown in FIG. 1, but, of course, it requires that the make-up pump deliver oil to working space 22a on the return stroke of main pump 17.

FIG. 3 illustrates an alternative relief mechanism which may be used in either of the preceding embodiments. In this version, the exhaust passage 29 is in constant communication with working space 22a, and the selector valve defined by piston 19 and port 31 controls only the connection to the relief valve-actuating motor 28b. The alternative relief mechanism performs the same functions as the one shown in FIG. 1, but here the selector valve effects closure of exhaust passage 29 indirectly through relief valve 28, rather than directly.

DESCRIPTION OF THE EMBODIMENTS OF FIGS. 4–6

As indicated earlier, the single-stage translator 11 is intended for use in installations where shoe clearance is very small. In other cases, it is more efficient, from the standpoint of air consumption, to employ a two-stage version of the invention. Several examples of this version are depicted in FIGS. 4–6.

As shown in FIG. 4, the two-stage translator 111 employs air-motor operated main and make-up pumps 117 and 118 similar to the pumps 17 and 18 employed in FIG. 1, but, in this case, the cylinder 122 of the main pump is provided with a step 132 which divides it into a small diameter portion which fits piston 119, and an enlarged portion 133 which serves as a by-pass connection for the spaces 122a and 122b. During the initial portion of each discharge stroke of pump 117, piston 119 is within the small diameter portion of cylinder 122, and the head and rod end spaces 122a and 122b, respectively, are isolated from each other. Therefore, in this stage, the volumetric displacement per unit of travel of piston 119 is proportional to the area of head end face 119a, and the pressure-transducing ratio equals the ratio of the effective area of the air motor to the area of face 119a. During the second stage of each discharge stroke, i.e., after piston 119 crosses step 132, spaces 122a and 122b are interconnected by enlargement 133. Under this condition, the volumetric displacement per unit of travel is determined by the cross sectional area of rod 121, and the pressure-transducing ratio equals the ratio of the effective area of the air motor to the cross sectional area of rod 121. In a typical translator 111, the low and high pressure-transducing ratios are 3:1 and 15:1, respectively.

The rod end space 122b of pump 117 is connected with tank 125 via two parallel passages 134 and 135 controlled by check valve 136 and vent valve 137, respectively. Passage 134 serves as a supply path through which oil is delivered to pump 117 during the low pressure stage of the discharge stroke of piston 119; the check valve 136 preventing reverse flow during the high pressure stage of the discharge stroke and thereby insuring development of the required braking pressure at port 123. Passage 135, on the other hand, provides an escape path through which the oil displaced from space 122b during the final portion of the return stroke of piston 119 can flow back to tank 125. The vent valve 137 in this path is biased closed by a spring 137a and is opened by a pair of motors 137b and 137c in response to a predetermined differential between the pressures in the rod and head end spaces 122b and 122a, respectively. During the initial stage of a return stroke, i.e., until piston 119 moves rightward beyond step 132 and isolates spaces 122a and 122b from each other, valve 137 remains closed, and the oil displaced from space 122b is transferred directly to space 122a. However, after the piston crosses step 132, the pressure in space 122b will rise above the pressure in space 122a, and valve 137 will open and allow the oil which is thereafter displaced from space 122b to escape to tank 125. In a typical case, the pressure differential required to open valve 137 is on the order of 5 p.s.i.

The make-up pumping scheme employed in FIG. 4 is the same as the one used in FIG. 1, but the relief mechanism is quite different. In the two-stage translator 111, the exhaust passage 129 leads to cylinder enlargement 133, and thus is in constant communication with working space 122a, and the relief valve 128 is equipped with a pair of opposed actuating motors 128b and 128c which sense the pressures in the spaces 122a and 122b, respectively. The closing bias exerted on relief valve 128 by spring 128a is selected in the same way as the closing bias of spring 28a in FIG. 1 and, in a typical case, keeps valve 128 closed until the pressure in space 122a exceeds by 30 p.s.i. the pressure in space 122b.

As piston 119 moves to the left during a brake application, it displaces oil from working space 122a and simultaneously draws oil into rod end space 122b through check valve 136 and passage 134. Initially, the resistance to movement of the brake cylinders is relatively small; consequently, relief valve 128 remains closed, and all the oil displaced from space 122a is delivered to the brake cylinders. However, after clearance take-up is complete, valve 128 will open and permit piston 119 to move across step 132 and into enlarged cylinder portion 133. At this time, spaces 122a and 122b are interconnected, so their pressures equalize, and spring 128a closes the relief valve. Moreover, since the effective area of pump 117 now is the cross sectional area of rod 121, rather than the area of end face 119a, the transducing ratio of translator 111 increases to its high value. As a result, the required braking pressure can be developed in the closed brake cylinder circuit. Inasmuch as translator 111 permits clearance take-up at a much smaller transducing ratio than the one used to set the brakes, it obviously minimizes air consumption.

When the brakes are released, oil is transferred from the brake cylinders back to working space 122a. During the initial stage of the return stroke of pump 117, i.e., as piston 119 moves back to step 132, the rate at which oil is withdrawn from the brake cylinders is proportional to the displacement of rod 121, since the oil displaced from rod end space 122b is transferred directly to head end space 122a. However, after the piston re-enters the small diameter portion of cylinder 122 and again isolates the spaces 122a and 122b from each other, the rate of transfer of oil from the brake cylinders to translator 111 increases to a higher value proportional to the area of head end face 119a. At this time, vent valve 137 will open and permit the oil subsequently displaced from rod end space 122b to return to tank 125. As in the case of the single-stage translator 11, make-up pump 118 will perform its compensating function on the return stroke of the main pump.

In the preferred two-stage translator, shown in FIG. 5, just as in the preferred single-stage device, the main pump 117 is utilized to perform the make-up function. In this scheme, the rod end face 119b of piston 119 and space 122b serve as the make-up pump, so check valve 136 performs the function of inlet check valve 126, which is no longer needed, and discharge check valve 127 is interposed in a make-up passage extending between the spaces 122a and 122b. Since a portion of the oil displaced from space 122b on the return stroke of piston 119 is now needed for make-up purposes and must be transferred to space 122a, the actuating circuit for vent valve 137 is designed to insure that it will not open until piston 119 has completed a prescribed portion of its return stroke. As shown in FIG. 5, this is accomplished by a selector valve which comprises the piston 119 and a port 138 located in the wall of the small diameter portion of cylinder 122, and which connects the valve-closing motor 137c with working space 122a or rod end space 122b depending upon the position of pump piston 119.

During a brake application, the preferred two-stage translator 111 operates in exactly the same way as its FIG. 4 counterpart, except that selector valve 119, 138 connects valve motor 137c with space 122b, and thereby equalizes the pressure forces acting on valve 137, before piston 119 crosses cylinder step 132. However, this happening has no effect upon the circuit components or their functions.

During a brake release, the preferred translator initially operates in the same way as the FIG. 4 embodiment, i.e., as piston 119 moves from its end position within enlargement 133 to the step 132 the oil displaced from rod end space 122b is transferred directly to working space 122a. However, as piston 119 moves through the next increment of travel, port 138 remains open to space 122b, so the pressures applied to the actuating motors 137b and 137c of vent valve 137 remain equalized. As a result, this valve stays closed, and the oil displaced from space 122b flows through check valve 127 into space 122a. The longitudinal spacing between the right margin of port 138 and step 132 is so selected that the quantity of oil displaced during this phase of the return stroke satisfies the make-up requirements of the translator. When piston 119 moves to the right of port 138, the port is connected with working space 122a, so the pressure applied to valve motor 137c decreases relatively to the pressure in motor 137b, and valve 137 opens. The closing bias exerted on valve 137 by spring 137a is so selected that the pressure differential required to open the valve is less than the differential required to open discharge check valve 127. Therefore, after piston 119 passes port 138, check valve 127 will close, and all the oil subsequently displaced from rod end space 122b will flow to tank 125 through vent valve 137.

An actual embodiment of the preferred two-stage translator 111 is depicted in FIG. 6. The construction and mode of operation of this version will be self-evident when it is realized that the flexible cup packing 139 carried by piston 119 serves as the discharge check valve 127 shown in FIG. 5. The packing 139 seals against the wall of cylinder 122 as piston 119 moves to the left on its discharge stroke and thus permits development in space 122a of the high pressures required for a brake application. However, on the return stroke, the packing will deflect inward and allow flow from space 122b to space 122a if the pressure in the former exceeds that in the latter by a predetermined amount. This predetermined value is higher than the pressure differential required to open vent valve 137; consequently, packing 139 will allow flow from space 122b to space 122a only during that portion of the return stroke between step 132 and port 138.

DESCRIPTION OF THE EMBODIMENT OF FIG. 7

In each embodiment of the invention, the closed brake cylinder circuit is connected with the reservoir 25 or 125 through a rather long column of oil subject to a small gravity head, and the discharge check valve 27 or 127 of the make-up pump is relied upon to prevent build-up of pressure in that circuit when the translator is idle and the brakes are released. While this condition normally produces no adverse effects, experience shows that, when the train runs on rough track for prolonged periods during which no brake application is made, repeated sloshing of the oil in the liquid column may gradually raise the pressure in the closed circuit. If the pressure becomes high enough, brake cylinders 13 and 14 will extend and cause the shoes to drag on the wheels. This condition can be eliminated easily in the embodiments of FIGS. 1–4 by merely increasing the closing bias acting on the discharge check valve 27 or 127 so that the valve will stay closed under the most severe dynamic pressure conditions encountered in service. This change, of course, increases the head pressure against which the make-up pump must operate, but, since the designer has complete freedom in selecting the displacement per unit of travel and the effective stroke of the make-up pump to produce the required total volume of make-up oil, the force level of the return spring 16 need not be increased. In the case of the embodiments of FIGS. 5 and 6, however, the situation is quite different. In these versions of the invention, the displacement per unit of travel of the make-up pump, i.e., the difference between the cross sectional areas of piston 119 and rod 121, is fixed by the selected transducing ratios and cannot be reduced to offset an increase in the back-pressure produced by discharge check valve 127. Therefore, if the closing bias on the discharge check valve were increased, the return force developed by spring 116 would have to be increased. This, of course, would result in a reduction in the efficiency of the translator 111.

The adverse dynamic pressure effect in the preferred embodiments of FIGS. 5 and 6 can be eliminated without impairing translator efficiency by rearranging the make-up passage 127a so that it extends between head end space 122a and port 138, rather than between the head end space and rod end space 122b. This modification, which is illustrated in FIG. 7, utilizes the selector valve 119, 138 to isolated head end space 122a, and the connected closed brake cylinder circuit, from the liquid column extending between reservoir 125 and rod end space 122b when piston 119 is retracted and translator 111 is at rest. Therefore, the pressures developed in that column, as a result of the accelerating forces imposed on it, are not transmitted to the brake cylinders. Since the piston packing 139 in this embodiment cannot serve as the discharge check valve for the make-up pump, it must be stiff enough to remain in sealing engagement with the wall of cylinder 122 throughout the final portion of the return stroke of piston 119 (i.e., as piston 119 moves from step 132 to its fully retracted position).

During a brake application, a translator 111 incorporating the modification of FIG. 7 operates in exactly the same way as the ones shown in FIGS. 5 and 6, except that the pressures applied to check valve 127 are balanced, rather than unbalanced in the closing direction, until piston 119 overtravels port 138 and connects it with rod end space 122b. During a brake release, the essential operations also remain unchanged. However, it will be noted that when piston 119 moves to the right of port 138, selector valve 119, 138 will interconnect the opposite sides of check valve 127, and this valve will close as a result of being subjected to balanced pressures rather than as a result of the opening of vent valve 137. Therefore, in the FIG. 7 scheme, check valve 127 need not be set to open at a higher differential pressure than vent valve 137.

Although the new translators have been described herein in connection with an air brake system, it should be evident that they can be used to transduce hydraulic pressures. Thus, any version of the device could be employed in the brake circuits of my copending application Ser. No. 726,766, filed May 6, 1968, to boost or amplify the hydraulic output pressure of the hand brake control station. Moreover, by including an additional fluid motor 15 or 115, the translator 11 or 111 can be made to transduce selectively either an air pressure or a hydraulic pressure. Finally, it should be noted that, if the pump-operating motor were reversed so that chamber 15a is its working space and chamber 115b is vented, the translator could be used to transduce the output pressure of a conventional vacuum braking system.

I claim:
1. A fluid pressure translator comprising
   (a) a hydraulic pump (17 or 117) including reciprocating piston means (19 or 119), and a working space (22a or 122a) connected in a closed hydraulic circuit with at least one hydraulic motor (13 or 14) having a working stroke whose length varies during service,
   (b) the piston means (19 or 119) having a pumping cycle composed of a discharge stroke during which it displaces oil from the working space into the hydraulic motor, and a return stroke during which it retracts and allows oil to be returned from the hydraulic motor to the working space;
   (c) fluid pressure motor means (15, 16 or 115, 116) for moving the piston means on said strokes;
   (d) relief means (19, 28, 31 or 128) effective during an initial stage of each discharge stroke to sense the pressure in the closed circuit and open an exhaust path (29 or 129) leading from said circuit to a reservoir (25 or 125) when the pressure exceeds a predetermined value, and effective during the balance of each discharge stroke to close said exhaust path,
   (e) the relief means constituting the sole means for automatically permitting escape of oil from the closed circuit during each pumping cycle; and
   (f) make-up means (18, 118, 19b or 119b) effective during each pumping cycle to deliver to the closed circuit a fixed quantity of oil smaller than the volume displaced by the piston means during said initial stage of each discharge stroke,
   (g) whereby, during service, the quantity of oil in the closed circuit changes directly with changes in the length of the working stroke of the hydraulic motor.

2. A fluid pressure translator as defined in claim 1 in which the make-up means delivers oil to the working space (22a or 122a) during each return stroke of the piston means.

3. A fluid pressure translator as defined in claim 1 in which
   (a) the piston means comprises a differential area piston (19 or 119) mounted in a cylinder (22 or 122) and dividing the cylinder into a head end space (22a or 122a), which serves as said working space, and a rod end space (22b or 122b);
   (b) the rod and head end spaces are interconnected through flow means (27; 127 or 119, 138, 127) adapted to permit flow from the rod end space (22b or 122b) to the head end space (22a or 122a) during at least a portion of each return stroke of the piston (19 or 119);
   (c) the rod end space (22b or 122b) is connected with said reservoir (25 or 125) by a supply passage containing a check valve (26, 126 or 136) oriented to permit flow toward the space; and
   (d) the piston, the rod end space, the flow means, the supply passage, the reservoir and the check valve define said make-up means.

4. A fluid pressure translator as defined in claim 3 in which the flow means comprises a make-up passage connected at its opposite ends to the head and rod end spaces, respectively, and containing a check valve (27 or 127) oriented to permit flow toward the head end space.

5. A fluid pressure translator as defined in claim 3 in which the flow means comprises
   (a) a make-up passage (127a) connected at one end to the head end space (122a) and containing a check valve (127) oriented to permit flow toward that space; and
   (b) a selector valve (119, 138) operated by the fluid pressure motor means for connecting the opposite end of the make-up passage with the rod end space (122b) during a portion of each return stroke and a corresponding portion of each discharge stroke, and for connecting said opposite end with the head end space (122a) during the balance of each stroke.

6. A fluid pressure translator as defined in claim 1 in which the relief means comprises
   (a) a relief valve (28) which is arranged to open and close said exhaust path and is biased closed;
   (b) a fluid pressure actuating motor (28b) for opening the relief valve; and
   (c) a selector valve (19, 31) which is operated by the fluid pressure motor means and is adapted to connect the working space (22a) with the actuating motor (28b) during said initial stage of each discharge stroke and to isolate the actuating motor from the working space during the balance of each discharge stroke.

7. A fluid pressure translator as defined in claim 6 in which said exhaust path (29) is in continuous communication with the working space (22a).

8. A fluid pressure translator as defined in claim 6 in which the exhaust path (29) leads to the working space (22a) through the selector valve (19, 31).

9. A fluid pressure translator as defined in claim 6 in which
   (a) the hydraulic pump (17) includes a cylinder (22) containing the piston means (19) and whose wall is provided with a port (31) which is connected with the actuating motor (28b) and is positioned along the path of travel of the piston means,
   (b) the port and the piston means defining said selector valve.

10. A fluid pressure translator as defined in claim 1 in which the volumetric displacement of the piston means (19) per unit of travel is constant throughout each discharge stroke.

11. A fluid pressure translator as defined in claim 1 in which the volumetric displacement of the piston means (119) per unit of travel is greater during said initial stage of each discharge stroke than during the balance of each such stroke.

12. A fluid pressure translator as defined in claim 11 in which
  (a) the piston means comprises a differential area piston (119) mounted in a cylinder (122) and dividing the cylinder into a head end space (122a), which serves as said working space, and a rod end space (122b),
  (b) said spaces being isolated from each other during said initial stage of each discharge stroke and a corresponding final stage of each return stroke by the fit between the piston and cylinder, and being interconnected through by-pass means (133) during the balance of each stroke;
  (c) the rod end space (122b) is connected with a pair of parallel fluid transfer passages (134, 135) whose opposite ends are connected to said reservoir, the first passage (134) including a check valve (136) oriented to permit flow toward the space, and the second passage (135) containing a vent valve (137),
  (d) the vent valve (137) being responsive to the difference between the pressures in the spaces (122a, 122b) at least during a major part of said final portion of the return stroke for opening the second transfer passage (135) when the pressure in rod end space (122b) exceeds by a predetermined amount the pressure in head end space (122a); and
  (e) the relief means comprises a valve (128) which is actuated by the pressures in said spaces (122a, 122b) and opens said exhaust path (129) when the pressure in head end space (122a) exceeds the pressure in rod end space (122b) by a predetermined amount.

13. A fluid pressure translator as defined in claim 12 in which
  (a) the make-up means comprises
    (1) said piston (119), rod end space (122b), first passage (134) and check valve (136), and
    (2) a make-up passage connected at its opposite ends to the head and rod end spaces, respectively, and containing a check valve (127) adapted to permit flow to the head end space (122a) upon the occurrence of a higher differential between the pressures in said spaces than that required to open the vent valve (137); and
  (b) the vent valve (137) is actuated by a pair of opposed pressure motor (137b, 137c), one motor (137b) being in constant communication with the rod end space (122b) and urging the valve open, and the other motor (137c) being selectively connected with the spaces (122a, 122b) through a selector valve (119, 138) operated by said motor means,
  (c) the selector valve (119, 138) serving to connect said other motor (137c) with the head end space (122a) throughout all but a small terminal part of the initial stage of the discharge stroke and throughout all but the corresponding beginning part of the final stage of the return stroke, and to connect that motor (137c) with the rod end space (122b) during the balance of the discharge and return strokes.

14. A fluid pressure translator as defined in claim 13 in which the selector valve includes
  (a) a port (138) in the wall of said cylinder (122) and connected with said other motor (137c); and
  (b) the piston (119).

15. A fluid pressure translator as defined in claim 14 in which the check valve of the make-up means comprises a flexible packing (139) carried by the piston (119) and which bears resiliently against the wall of the cylinder (122).

16. A fluid pressure translator as defined in claim 12 in which
  (a) the vent valve (137) is actuated by a pair of opposed pressure motors (137b, 137c), one motor (137b) being in constant communication with the rod end space (122b) and urging the valve open, and the other motor (137c) being selectively connected with the spaces (122a, 122b) through a selector valve (119, 138) operated by said motor means;
  (b) the selector valve (119, 138) serves to connect said other motor (137c) with the head end space (122a) throughout all but a small terminal part of the initial stage of the discharge stroke and throughout all but the corresponding beginning part of the final stage of the return stroke, and to connect that motor (137c) with the rod end space (122b) during the balance of the discharge and return strokes; and
  (c) the make-up means comprises
    (1) said piston (119), rod end space (122b), first passage (134) and check valve (136), and
    (2) a make-up passage (127a) having one end in constant communication with the head end space (122a) and an opposite end which is alternately connected with the head end and rod end spaces, respectively, by said selector valve (119, 138),
    (3) the make-up passage containing a check valve (127) oriented to permit flow toward the head end space (122a).

17. A fluid pressure translator as defined in claim 16 in which the selector valve includes
  (a) a port (138) in the wall of said cylinder (122) and connected with said other motor (137c) and the make-up passage (127a); and
  (b) the piston (119).

18. A fluid pressure translator as defined in claim 1 in which the make-up means is driven by said motor means.

References Cited

UNITED STATES PATENTS 2,437,821  3/1948  Hughes _____ 60—54.5
2,882,685  4/1959  Carlsen et al. _____ 60—54.5

FOREIGN PATENTS 769,257  6/1934  France.

MARTIN P. SCHWADRON, Primary Examiner
R. BUNEVICH, Assistant Examiner

U.S. Cl. X.R.
60—54.6